United States Patent [19]

Zagefka et al.

[11] Patent Number: 5,057,553
[45] Date of Patent: Oct. 15, 1991

[54] CROSSLINKABLE COMPOSITIONS, PROCESS FOR THEIR PREPARATION AND THEIR USE AS CASTING COMPOSITIONS AND FOR THE PRODUCTION OF MOULDINGS

[75] Inventors: Hans-Dieter Zagefka, Haltern; Angelika Kahlert, Marl, both of Fed. Rep. of Germany

[73] Assignee: Huels Aktiengesellschaft, Marl, Fed. Rep. of Germany

[21] Appl. No.: 377,077

[22] Filed: Jul. 10, 1989

[30] Foreign Application Priority Data

Sep. 10, 1988 [DE] Fed. Rep. of Germany ....... 3830895

[51] Int. Cl.$^5$ .............................................. B22D 7/10
[52] U.S. Cl. .................................... 523/180; 524/549; 525/327.7; 525/384
[58] Field of Search .......................... 525/384, 327.7; 523/180; 524/549

[56] References Cited

U.S. PATENT DOCUMENTS

| | | | |
|---|---|---|---|
| 2,988,539 | 6/1961 | Cohen et al. | 525/384 |
| 3,245,933 | 4/1966 | Muskat | 525/384 |
| 3,346,546 | 10/1967 | Beach et al. | 525/384 |
| 3,678,016 | 7/1972 | Zimmerman et al. | 525/384 |
| 4,145,321 | 3/1979 | Lee . | |
| 4,497,663 | 2/1985 | Fisher et al. . | |

FOREIGN PATENT DOCUMENTS 2572417  5/1986  France .

*Primary Examiner*—Bernard Lipman
*Attorney, Agent, or Firm*—Oblon, Spivak, McClelland, Maier & Neustadt

[57] ABSTRACT

Crosslinkable compositions, a process for their preparation, and their use as casting compositions and for the production of mouldings. The composition can be homogeneously crosslinked at low temperatures. The compositions contain, as a binder, an adduct of maleic anhydride and a polymer based on 70–100% of butadiene and 0–30% of $C_{2-12}$ olefins and/or $C_{4-12}$ dienes. The compositions are employed as cable jointing compositions or for the production of mouldings.

18 Claims, No Drawings

CROSSLINKABLE COMPOSITIONS, PROCESS FOR THEIR PREPARATION AND THEIR USE AS CASTING COMPOSITIONS AND FOR THE PRODUCTION OF MOULDINGS

BACKGROUND OF THE INVENTION

1. Field of the Invention:

The invention relates to novel, crosslinkable, elastic compositions, a process for their preparation, and their use as casting compositions and for the production of mouldings. The applications of these compositions are extremely versatile. They include joint sealants, adhesives, putties, knifing fillers and vibration-damping compositions.

2. Discussion of the Background Art:

The prior art reveals crosslinkable, elastic compositions which are obtained by mixing hydroxyl group-containing polybutadienes with various crosslinking agents and which are used, for example, as cable jointing compositions. Also taught are processes in which carboxyl group-containing polybutadienes are reacted with epoxides (see DE-OSS 22 57 053 and 27 41 453). As the catalyst, tertiary amines are frequently used (see DE-OSS 21 40 949 and 22 05 209). In the context of this invention, "elastic compositions" are to be regarded as being compositions whose elongation value is at least 10%.

Although the known compositions satisfy some important applicational requirements, namely that they can be mixed to a high proportion with fillers and can be crosslinked at various temperatures in a relatively short or relatively long time, they still, however, have the following disadvantages:

1. There are toxicological doubts about some components of these compositions, such as epoxides and diisocyanates, since the compositions are frequently prepared by untrained personnel and misuse cannot be excluded.

2. Some crosslinking systems are not sufficiently reactive. The consequence is, in some cases, very long crosslinking times. This objection applies, for example, to the compositions which are described in European Patent 0,049,098 and which comprise an epoxy resin and a maleated polybutadiene.

3. Although the compositions described, for example, in DE-OS 34 36 556 are prepared from toxicologically acceptable components, they do not always enable flawless moulding. This applies, in particular, to use at low temperatures.

Irrespective of these observed disadvantages of the known compositions based on functionalized polybutadienes, it must be ensured that no cleavage products are produced during the subsequent cross-linking reaction. No shrinkage may occur during crosslinking and, finally, homogeneous crosslinking should occur, even in the absence of oxygen and solvents.

There have been numerous attempts to improve the properties of compositions of this type based on polybutadiene by developing newer crosslinking agents. However, a completely satisfactory solution has not been found.

SUMMARY OF THE INVENTION

Accordingly, one object of the present invention is to provide a toxicologically acceptable crosslinkable composition based on polybutadiene which overcomes the deficiencies of the prior art composition noted above.

Compositions have now been discovered which are easily accessible from toxicologically acceptable starting materials and which cure—even at low temperatures—with low shrinkage to form homogeneously crosslinked parts. These compositions contain, as a binder, an adduct of maleic anhydride and a polymer based on butadiene and, as crosslinking agent, a liquid low molecular weight, at least bifunctional alcohol, in particular a diol or polyol having a molecular weight of up to 800. The ratio between the anhydride groups of the binder and the hydroxyl groups of the crosslinking agent is preferably about 0.9 to 1.1. A polybutadiene/maleic anhydride adduct having an average functionality of at least 1.3 anhydride groups per molecule is preferred. The compositions may additionally contain fillers and additives. It is surprising that the novel compositions are extremely reactive since, as is known, alcohols are less reactive to acid anhydrides than are the corresponding epoxide systems known from the prior art. Although low molecular weight alcohols are employed, the crosslinking density is nevertheless very high. This can be seen from the fact that the compositions according to the invention can be mixed with a considerable amount of fillers.

The compositions of the present invention can be prepared by intimate mixing of the components, optionally using slightly elevated temperatures, preferably in the absence of a solvent. During the preparation of the compositions, which are crosslinkable at low temperatures, i.e. at temperatures in the range from about 0° to 30° C., up to 2 parts by weight, based on 100 parts by weight of binder and crosslinking agent, of a tertiary amine catalyst are preferably added. Finally, the invention relates to the use of the compositions as casting compositions, for the production of mouldings or as extrudable compositions.

DETAILED DESCRIPTION OF THE PREFERRED EMBODIMENTS

The binders used according to the invention can be obtained in a known manner by the addition reaction of maleic anhydride with a butadiene polymer (see, for example, DE-AS 23 62 534). The butadiene polymer may already contain other functional groups, such as, for example, reactive silyl groups (see DE-PS 3,028,839).

In place of the homopolymers of 1,3-butadiene, copolymers based on at least 70% of butadiene and up to 30% of a comonomer can also be employed. Suitable comonomers are vinyl-aromatic compounds, olefins having 2 to 12 carbon atoms and/or dienes having 4 to 12 carbon atoms, for example cycloalkadienes having 5 to 12 carbon atoms, such as dicyclopentadiene. Preferred comonomers are isoprene, cyclopentadiene, styrene and ethylene.

The crosslinking agent is a low molecular weight alcohol having at least 2 OH groups, in particular a diol or polyol having a number average molecular weight of up to 800. The alcohol may contain ether groups. For example, alkylene diols and triols may be used.

Suitable diols are, for example, ethylene glycol, 1,4-cyclohexanedimethanol and neopentyl glycol, the dimers thereof, and trimethylolpropane monoallyl ether. Triols such as glycerol and polyols such as the condensation products of trimethylolpropane, and mixtures containing pentaerythritol or dipentaerythritol are preferred. Polyols of this type are marketed, for example, by Perstorp AB, S-28480 Perstorp, Sweden. The crosslinking agent must be liquid. It is therefore necessary, when solid polyols are used, to add at least sufficient amount of liquid alcohol so that the resultant mixture is liquid.

The amount of maleic anhydride used should be sufficient to provide a binder which contains at least 1.3 anhydride groups, more preferable greater than 2.0 anhydride groups per binder molecule.

Catalysts are preferably added to the compositions when crosslinking at low temperatures is intended. However, their addition is also advisable if the reaction times are to be shortened. In this regard, see EP-OS 0 181 441.

The following added substances can also be added to the compositions: fillers, additives, extenders, and reactive modifiers.

Suitable fillers are, for example carbon black, talc, mica, asbestos, kaolin, other natural and synthetic silicates, quartz sand, sand, precipitated and pyrogenic silica, ground slag, fly ash, cement, gypsum, barium sulphate, pulverulant metals, plate-form metals or fiber-form metals and the carbides and nitrides and borides thereof, raw ground rubber and synthetic polymers, such as, for example, PVC, polyolefins and polystyrene, in the form of fibers, powders or in the foamed (expanded) state. Suitable fillers are furthermore glass fibers, glass microbeads, hollow glass microbeads and other fillers having a silicate structure, oxides, hydroxides and carbonates of metals. Explosives such as hexogen and octogen are also suitable.

The bonding of the fillers to the binder matrix can under certain circumstances be markedly improved by the addition of customary adhesion promoters, for example those from the group comprising the organofunctional silanes and titanes.

The glass-containing fillers, in particular, can be coated with silanes carrying amino groups or epoxide groups, so that they are capable of reacting with the anhydride groups of the binder and/or the carboxyl groups of the binder matrix.

Crosslinked compositions having particularly high toughness and tear propagation strength are obtained if the oxides, hydroxides and carbonates of the alkali metals or of zinc are employed as fillers. Chalk is particularly preferred in this regard.

Organic fillers whose surface contains primary and/or secondary hydroxyl groups, such as, for example, starch, cellulose fibers, cellulose powder, saw dust, ground nut shells, rice husks, corn flour, ground bark and the like can also contribute significantly to the strength and elasticity of the composition.

The additives are, for example, anti-ageing agents and light absorbers, pigments, dyes which are soluble in the composition, adhesion promoters, thickeners, flame-inhibiting additives, smoke-reducing additives and, in specific cases, combustion-accelerating additives. The additives may contain groups which are capable of reacting with the anhydride groups of the binder and/or the carboxyl groups of the binder matrix. They are bound into the crosslinked composition, which means that evaporation and migration losses and exudations are avoided.

The extenders are customary extender oils or plasticizers.

The reactive modifying components which are capable of reaction with the anhydride groups of the binder and/or the carboxyl groups of the binder matrix are, for example, incompletely cured epoxy resins, phenoplastics, amino plastics, ketone resins (which may have been hydrogenated) copolymers of maleic anhydride with alpha-olefins, polyethylene glycol, polypropylene glycol, polytetramethylene glycol and other substances which are customary in the polyurethane area and are used as hydroxyl components.

The functionality of the binder should be selected so that it is adequate for formation of the binder matrix and optionally for reaction with the fillers, the additives and the modifying components.

The ratio between the acid anhydride groups in the binder and the hydroxyl groups in the crosslinking agent of the present compositions is generally 0.9–1.1 or about 1:1. The relative amounts of binder and crosslinking agent can be readily determined and used so as to obtain the appropriate ratio.

The crosslinking density which can be achieved using the compositions of the invention can be adjusted within broad limits by varying the hydroxyl and acid numbers, the molecular weight and the mixing proportions of the crosslinking agent and of the binder, and, if appropriate, through the nature and amount of the added substances. Thus depending on the intended use, hard or soft crosslinked compositions having a high or low crosslinking density can be obtained.

The crosslinkable compositions of the present invention are prepared by intimately mixing the binder and the crosslinking agent and optionally, any additional additives. The intimate mixing may be performed by any conventional batch or continuous flow mixing apparatus. The mixing is preferably conducted in the absence of a solvent. Mixing may be performed at ambient temperatures or at slightly elevated temperatures to facilitate mixing.

In addition to the applications mentioned above, the following areas of application should be mentioned: erasers, screening agents against electromagnetic and nuclear radiation, soundproofing compositions, compositions for the production of gaskets, solid propellants and rocket propellants, where the additives to be employed include ammonium perchlorate and further substances which affect combustion, such as, for example, aluminium powder, ferrocene compounds and/or carborane compounds. It is also possible to add compounds which improve the oxygen balance in compositions of this type.

Other features of the invention will become apparent in the course of the following descriptions of exemplary embodiments which are given for illustration of the invention and are not intended to be limiting thereof.

EXAMPLES

The invention is illustrated by means of the examples below. In these examples, parts denote parts by weight and per cent (%) denote % by weight.

In the case of the polybutadienes employed, the number average molecular weight $M_n$ is determined by vapor pressure osmometry. The microstructure was determined by IR spectroscopy. The viscosity was determinated at 20° C. in accordance with DIN 53 015. The acid number (AN) of the binder was determined in accordance with DIN 53 402.

The gel content of the crosslinked compositions was determined indirectly by dissolving a sample in toluene at 20° C., separating off the undissolved component by filtration, and determining the dissolved component gravimetrically.

EXAMPLE 1

Polybutadienes 1.1 A polybutadiene having a molecular weight of 1,700 was prepared by Ziegler-Natta polymerization of butadiene and had the following microstructure:
72% of 1,4-cis structure
27% of 1,4-trans structure
1% of 1,2 structure.

1.2 A polybutadiene having a molecular weight of 2,750 was prepared by Ziegler-Natta polymerization of butadiene and had the following microstructure:
80% of 1,4-cis structure
19% of 1,4-trans structure
1% of 1,2 structure.

1.3 An adduct containing 2.5% of silicon was obtained by reacting the polybutadiene of example 1.1 with vinyltrimethoxysilane in accordance with DE-OS 30 28 839. The properties of this product, which is marketed under the name POLYVEST ® 25, are given in Product Information Sheet 3324/11.85.

EXAMPLE 2

Binders 2.1 The polybutadiene of example 1.1 was reacted with 7.5% of maleic anhydride in the presence of 0.01% of N-isopropyl-N'-phenyl-p-phenylenediamine over the course of 3 hours at 190° C. The carboxylated polybutadiene obtained had an acid number of 70 mg of KOH/g and a viscosity of 5,700 mPa.s.

2.2 The polybutadiene of example 1.2 was reacted analogously to example 2.1. The product had an acid number of 57 mg of KOH/g and a viscosity of 35,000 mPa.s.

EXAMPLE 3

Crosslinking agents 3.1 Glycerol 3.2 A mixture of neopentyl glycol and glycerol in the ratio 1:1.

3.3 Cyclohexanedimethanol 3.4 A hydroxyl group-containing polybutadiene having a molecular weight of 2,790, a OH number of 54 mg of KOH/g (determined in accordance with DIN 53 240) and a viscosity of 36,000 mPa.s.

EXAMPLE 4

Unfilled casting compositions

The crosslinking agent, the binder and the catalyst were mixed intimately at 20° C. and left to stand. The binder: crosslinking agent ratio was adjusted so that equimolar amounts of anhydride and hydroxyl groups were available in the mixture. The catalyst employed in each case was 1% of tetramethylethylenediamine, based on the amount by weight of the binder. If the catalyst was omitted, the mixture cured fully within about 72 hours.

The viscosity of the compositions obtained is shown in Table 1 below.

TABLE 1

| Binder | Crosslinking agent | Viscosity (mPa · s) |
| --- | --- | --- |
| Ex. 2.1 | Ex. 3.1 | 5,600 |
| Ex. 2.1 | Ex. 3.2 | 5,500 |

TABLE 1-continued

| Binder | Crosslinking agent | Viscosity (mPa · s) |
| --- | --- | --- |
| Ex. 2.1 | Ex. 3.3 | 5,400 |
| Ex. 2.1 | Ex. 3.4 | 13,200 |

EXAMPLE 5

Filled casting compositions

Casting compositions were prepared in accordance with the data in Table 2 below. The catalyst employed was 1% of tetramethylethylene diamine, in each case based on the binder.

TABLE 2

| Example | Parts of binder | Crosslinking agent | Parts of crosslinking agent | Filler | Parts of filler | Crosslinking time in hr. at room temperature |
| --- | --- | --- | --- | --- | --- | --- |
| 5.1 | 50.00 | Ex. 3.3 | 2.76 | Chalk | 50.00 | 1.5 |
| 5.2 | 50.00 | Ex. 3.3 | 1.19 | Chalk | 50.00 | 1.5 |
| 5.3 | 50.00 | Ex. 3.2 | 1.88 | Chalk | 50.00 | 2.5 |
| 5.4 | 50.00 | Ex. 3.1 | 1.19 | PVC powder*) | 50.00 | 1.0 |
| A | 25.38 | Ex. 3.4 | 24.62 | Chalk | 50.00 | 1.0 |

*)VESTOLIT ® B 7021, a product from Huls AG, D-4370 Marl. Properties of the product are given in the product brochure 4354/07.86.

Test specimens were prepared from the filled compositions 5.1–5.4 and the comparison composition A. The mechanical values of the individual compositions were determined in a tensile testing machine (Table 3).

TABLE 3

| | Tear strength in N/mm² after storage | | Elongation in % after storage | |
| --- | --- | --- | --- | --- |
| Example | 3 days 20° C. | 7 days 70° C. | 3 days 20° C. | 7 days 70° C. |
| 5.1 | 23.3 | 69.6 | 203.5 | 105.9 |
| 5.2 | 45.9 | 76.8 | 146.6 | 54.1 |
| 5.3 | 28.4 | 87.3 | 202.8 | 82.3 |
| 5.4 | 93.9 | 112.2 | 57.7 | 44.0 |
| A | 28.2 | 67.8 | 151.5 | 28.3 |

Due to their lower viscosity, the compositions according to the invention can be processed better than those obtained in accordance with the prior art. Furthermore, the degree of filling can be increased compared with comparable amounts from the prior art. This is a basic advantage in applications. For example, solid propellants using hexogen as a filler can be prepared with a high energy density Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A crosslinkable composition, consisting essentially of
   a binder, wherein said binder is an anhydride group-containing adduct of maleic anhydride and a polymer comprising 70–100 wt. % butadiene and 30–0 wt. % of copolymerizable vinyl-aromatic, $C_{2-12}$ olefin, $C_{4-12}$ diene monomers and mixtures thereof, and
   a low molecular weight liquid diol or polyol crosslinking agent.

2. The composition of claim 1, wherein the ratio between the anhydride groups of the binder and the hydroxyl groups of the crosslinking agent is between 0.9 and 1.1.

3. The composition of claim 1, wherein the low molecular weight alcohol has a molecular weight of up to 800.

4. The composition of claim 1, wherein the binder is an adduct of maleic anhydride and polybutadiene.

5. The composition of claim 4, wherein the polybutadiene/maleic anhydride adduct contains an average of at least 1.3 anhydride groups per molecule.

6. The composition of claim 5, wherein the adduct contains greater than 2.0 anhydride groups per molecule.

7. The composition of claim 1, further comprising fillers or explosives.

8. The composition of claim 7, wherein said filler is a silicate, synthetic polymer or glass fiber.

9. The composition of claim 7, wherein said explosive is hexogen or octogen.

10. The composition of claim 1, wherein said crosslinking agent is selected from the group consisting of ethylene glycol, 1,4-cyclohexane dimethanol, neopentyl glycol, dimers of ethylene glycol, 1,4-cyclohexane dimethanol and neopentyl glycol, and trimethylolpropane monoallyl ether.

11. The composition of claim 1, wherein said crosslinking agent is selected from the group consisting of glycerol, condensation products of trimethylolpropane, pentaerythritol, dipentaerythritol and mixtures thereof.

12. A process for preparing a crosslinked composition, consisting essentially of the steps of:
   intimately mixing the binder and the crosslinking agent of claim 1, and
   curing said mixed binder and crosslinking agent to produce a crosslinked composition.

13. The process of claim 12, wherein said mixing step is conducted in the absence of a solvent.

14. The process of claim 12, wherein said curing step is conducted at a temperature in the range from about 0° to 30° C.

15. The process of claim 12, wherein up to 2 parts by weight of a catalyst, based on 100 parts by weight of said binder and crosslinking agent is added during said mixing step.

16. The process of claim 15, wherein said catalyst is a tertiary amine.

17. The process of claim 12, wherein said binder and said crosslinking agent are added in amounts such that the ratio between the anhydride groups of the binder and the hydroxyl groups of the crosslinking agent is between about 0.9 and 1.1.

18. The process of claim 17, wherein the ratio between the anhydride groups of the binder and the hydroxyl groups of the crosslinking agent is about 1:1.

* * * * *